Nov. 1, 1932.   H. T. LEWIS   1,885,926
LIQUID MEASURING DEVICE
Filed June 24, 1931
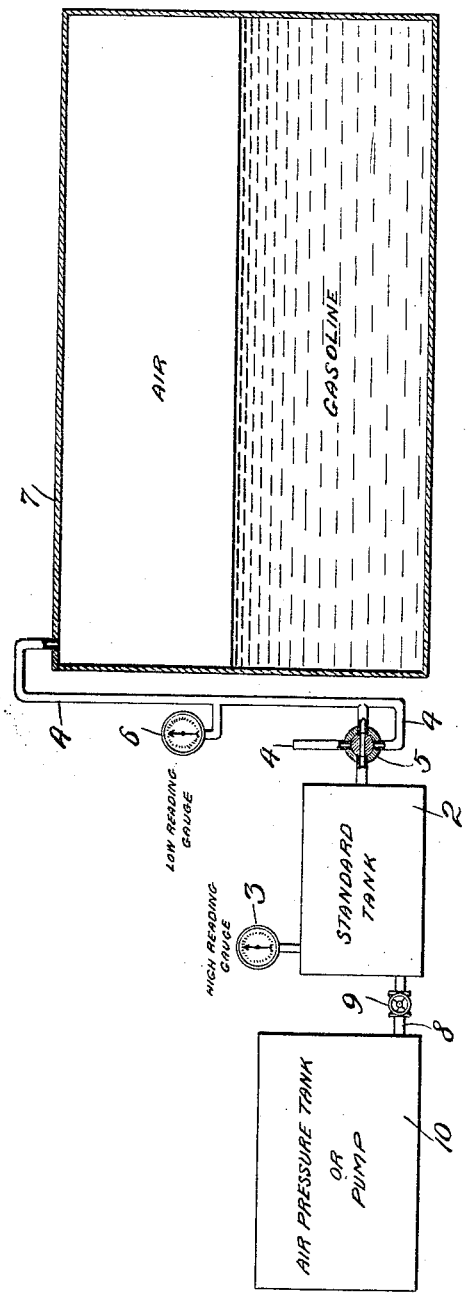
INVENTOR
HARRY T. LEWIS
BY O. Ellery Edwards
ATTORNEY

73. MEASURING AND TESTING.

Patented Nov. 1, 1932

1,885,926

UNITED STATES PATENT OFFICE

HARRY T. LEWIS, OF HAMPTON, VIRGINIA

LIQUID MEASURING DEVICE

Application filed June 24, 1931. Serial No. 546,439.

Heretofore a great many accidents have been caused in aeroplanes because it is not possible to accurately determine when the gasoline is exhausted or nearly so, except that when exhausted, the engine or engines cease to function. This is a very dangerous condition because the aviator finds himself without power or control when he may need it most. There are a number of gasoline indicators which indicate the amount of gasoline in a tank when the same is nearly full but these prove utterly unreliable when the liquid is approaching exhaustion.

The object of my invention is to provide an unfailing source of information which will indicate accurately and whenever desired the amount of gasoline in each of the various tanks. This object is accomplished by my invention, one embodiment of which is hereinafter more particularly set forth.

For a more detailed description of my invention, reference is to be had to the accompanying drawing, forming a part hereof, which shows a simple embodiment of my invention.

My improved indicator 1 is composed of a suitable standard tank 2 with a high reading gauge 3 attached thereto, suitable piping 4 in which is placed a two-way valve 5 and a low reading gauge 6. The piping 4 is ordinarily a vent pipe and it runs to the top of each gasoline tank 7.

The standard tank 2 is also connected by a pipe 8 and a valve 9 placed therein to an air pressure tank or pump 10, which may be used at any time to supply air at any desired pressure to the standard tank 2.

Operation

Normally, the valve 5 has its passage so that the piping 4 serves for venting purposes only and is open to the atmosphere. This is at right angles to the position shown. When in this position, and it is desired to take a reading, the valve 9 is opened so as to permit a proper charge to enter the standard tank 2, and the high reading gauge 3 will indicate when this charge is at the desired amount, and then the valve is closed. Thereafter, the valve 5 is shifted to the position shown, and then the pressure from the standard tank is transmitted to the gasoline tank, and becomes uniform with the pressure in the standard tank, and through an application of Boyle's law, the pressure indicated at the low reading gauge 6 will be inversely proportional to the air space in the tank 7.

If desired, the low reading gauge 6 may be calibrated so as to read according to the number of gallons of gasoline in the tank, 7, so that by a direct reading it is possible to determine the exact contents of this tank at a given instant.

The apparatus will function as long as desired and when the reading has been had, it is preferable to shift the valve 5 back to its initial position at right angles to the position shown, and thereby let the tank 7 have the breathing opening or vent necessary in tanks of this kind.

While I have shown and described my invention as applied to tanks on aeroplanes, which is probably the most important application of my invention, it is also true that it may be used anywhere as in storage tanks at gasoline filling stations, or other places as may be desired.

While I have shown and described one embodiment of my invention, it is obvious that it is not restricted thereto, but that it is broad enough to cover all structures that come within the scope of the annexed claim.

Having thus described my invention, what I claim is:

In an apparatus of the class described, a standard tank, a pressure responsive gage mounted thereon, means for supplying the standard tank with a limited amount of gas under pressure, whereby a definite amount of gas at a definite pressure may be placed in this tank, a liquid containing tank, piping communicating with said standard tank and with the upper portion of said liquid containing tank above the liquid level therein, said piping having a vent to the atmosphere, a two way valve in said piping adapted in one position to establish communication between said tanks and adapted in another position to sever communication between said tanks and to establish communication between said vent and said liquid containing tank, and a pressure responsive gage communicating with said piping between said valve and said liquid containing tank, said last named gage being adapted to indicate the amount of liquid in said liquid containing tank.

In testimony whereof, I have hereunto set my hand this 23d day of May, 1931.

HARRY T. LEWIS.